US008561641B2

(12) United States Patent
Ogden et al.

(10) Patent No.: US 8,561,641 B2
(45) Date of Patent: Oct. 22, 2013

(54) UNDERGROUND STORAGE TANK

(75) Inventors: Walker Louis Ogden, Odum, GA (US); Michael Lillegaard Larson, Brunswick, GA (US); Michael Huffman, Jesup, GA (US); Donald Frank Fabricy, Lewisberry, PA (US)

(73) Assignee: Quality Steel, Cleveland, MS (US)

( * ) Notice: Subject to any disclaimer, the term of this patent is extended or adjusted under 35 U.S.C. 154(b) by 2451 days.

(21) Appl. No.: 11/370,598

(22) Filed: Mar. 8, 2006

(65) Prior Publication Data

US 2007/0209717 A1 Sep. 13, 2007

(51) Int. Cl.
*F16K 24/00* (2006.01)

(52) U.S. Cl.
USPC .......................................... 137/588; 137/364

(58) Field of Classification Search
USPC .......... 137/588, 587, 363, 364, 366; 403/353, 403/354
See application file for complete search history.

(56) References Cited

U.S. PATENT DOCUMENTS

| | | | | |
|---|---|---|---|---|
| 3,881,510 | A * | 5/1975 | Hansel | 137/590 |
| 3,915,206 | A * | 10/1975 | Fowler et al. | 141/59 |
| 5,150,730 | A * | 9/1992 | Campbell | 137/364 |
| 5,372,453 | A * | 12/1994 | Argandona | 137/371 |
| 5,826,447 | A * | 10/1998 | Campbell | 70/164 |
| 6,722,807 | B1 * | 4/2004 | Cornet et al. | 403/353 |

* cited by examiner

*Primary Examiner* — John K Fristoe, Jr.
*Assistant Examiner* — Andrew J Rost
(74) *Attorney, Agent, or Firm* — Eckert Seamans Cherin & Mellott, LLC; David C. Jenkins

(57) ABSTRACT

The present invention provides an underground tank having a vessel assembly and a generally spaced access assembly. That is, the access assembly includes a fuel line, a withdrawal line, and a dome assembly. The fuel line and the withdrawal line have a first end disposed outside the vessel assembly and a second end disposed adjacent to or within the vessel assembly. The first end extends upwardly from the vessel assembly toward the ground surface. The dome assembly is coupled adjacent to the fuel and withdrawal line first end. As such, the vessel assembly may be buried at any depth as the fuel and withdrawal lines may have any length.

19 Claims, 4 Drawing Sheets

UNDERGROUND STORAGE TANK

BACKGROUND OF THE INVENTION

1. Field of the Invention

This application relates to an underground storage tank having an access dome assembly and, more specifically, an underground storage tank wherein the access dome assembly is raised above the bulk of the underground storage tank.

2. Background Information

Underground storage tanks may be used for storing fuel, such as, but not limited to, propane which is used for heat within a home or business. The tanks include a sidewall defining an enclosed space in which the fuel is stored. The sidewall is typically an elongated cylinder having two hemispherical end lids. Such tanks are typically buried about one to two feet under the ground surface with the longitudinal axis extending generally horizontal. The tanks also typically include an access assembly having a fuel line, a withdrawal line and a dome assembly. The dome assembly extends upward from the tank and protrudes slightly above the ground surface. Within the dome assembly are the fuel line and the liquid withdrawal line. The fuel line is used to fill the vessel assembly with liquid fuel and to extract fuel gas. That is, within the vessel assembly, a portion of the fuel vaporizes and the fuel vapor is extracted to be used. The liquid withdrawal line is used to extract the liquid fuel if the tank needs to be emptied rapidly. Generally, the fuel line is raised above the surface of the vessel so that the fuel line connections may be accessed by a user. The liquid withdrawal line is generally flush with the vessel assembly so as to lessen the chance that the withdrawal line will be damaged. Other components of the tank, such as a control assembly (couplings for use devices, valves, gauges, and other such devices or structures) and a required data plate, are also disposed within the dome assembly. The dome assembly typically includes an elongated collar and a lid. The collar, which is typically cylindrical, extends from the vessel assembly sidewall to a point just above the ground surface. The lid is hinged to the collar.

One disadvantage of this configuration is that the depth at which the tank may be buried is controlled by the length of the collar. That is, the collar may not be too long otherwise a human would not be able to access certain components such as the data plate and the withdrawal line located on the vessel sidewall. Also, in this configuration, the coupling of the dome assembly to the vessel sidewall is difficult. That is, as noted above, the vessel sidewall is typically a horizontal cylinder while the dome assembly is a vertical cylinder. Thus, the intersection of these two cylinders is a complex line. As such, the fit between the dome assembly and the vessel assembly are difficult to seal.

There is, therefore, a need for an underground storage tank wherein the dome assembly does not need to be attached to the vessel assembly.

There is a further need for an underground storage tank wherein the withdrawal line includes a pressure relief device so that the withdrawal line may extend above the vessel assembly.

SUMMARY OF THE INVENTION

These needs, and others, are satisfied by the present invention which provides an underground tank having a vessel assembly and a generally spaced access assembly. That is, the access assembly includes the fuel line, the withdrawal line, and a dome assembly. The fuel line and the withdrawal line have a first portion disposed outside the vessel assembly and a second portion disposed within the vessel assembly. The first portion extends upwardly from the vessel assembly toward the ground surface. The dome assembly is coupled to the upper end of the fuel and withdrawal lines' first portion. As such, the vessel assembly may be buried at any depth as the fuel and withdrawal lines may have any length. Preferably, a base plate is coupled to the upper ends of the fuel and withdrawal lines. The dome assembly, preferably, includes a bottom plate, a circular collar, and a hinged lid. The dome assembly bottom plate is removably coupled to the base plate. The dome assembly defines an enclosed space for the control assembly, the coupling for the withdrawal line, and the data plate. The data plate is attached to the base plate, however, the bottom plate includes an opening so that the data plate is visible. The length and the diameter of the collar are structured so that a user may comfortably access the control assembly, the coupling for the withdrawal line, and the data plate.

The withdrawal line must include an additional safety feature as the withdrawal line now extends above the vessel assembly. As noted above, the fuel is typically placed into the vessel assembly as a liquid. A portion of the liquid evaporates and creates a vapor space within the upper portion of the vessel assembly enclosed space. The liquid fuel resides in a lower liquid space. The evaporation of the fuel also acts to pressurize the vessel assembly enclosed space. In the prior art, when the withdrawal line was flush with the vessel assembly, the withdrawal line was not as exposed to damage and, as such, was typically a single walled pipe extending to a point adjacent to bottom of the liquid space. If the vessel assembly needed to be emptied of liquid fuel, the withdrawal line was tapped and the pressure within the vessel assembly forced the liquid fuel to be expelled through the withdrawal line. To prevent liquid fuel, which is typically a greater hazard than gaseous fuel, from spilling in the event of damage to the elongated and exposed withdrawal line of the present invention, the withdrawal line includes a capped outer shell disposed about a withdrawal line pipe. That is, the withdrawal line includes an inner pipe that extends to the bottom of the vessel assembly liquid space and a closed shell disposed about the inner pipe. In this configuration, a plenum exists between the inner pipe and the outer shell. This plenum is in fluid communication with the vapor space within the vessel assembly. Thus, if the withdrawal line is damaged to the point that it is ruptured, the gaseous fuel within the vessel assembly will pass through the plenum and escape through the rupture in the outer shell. As the gaseous fuel escapes, the vessel assembly is depressurized and liquid fuel will not be forced out of the withdrawal line. This safety feature may also be incorporated into a traditional dome assembly having a raised withdrawal line.

BRIEF DESCRIPTION OF THE DRAWINGS

A full understanding of the invention can be gained from the following description of the preferred embodiments when read in conjunction with the accompanying drawings in which:

FIG. 3 is a detailed view of the dome assembly locking device where

DESCRIPTION OF THE PREFERRED EMBODIMENTS

As used herein, "coupled" means a link between two or more elements, whether direct or indirect, so long as a link occurs.

As used herein, "attached" means that two elements are directly in contact with each other.

Figure 1:
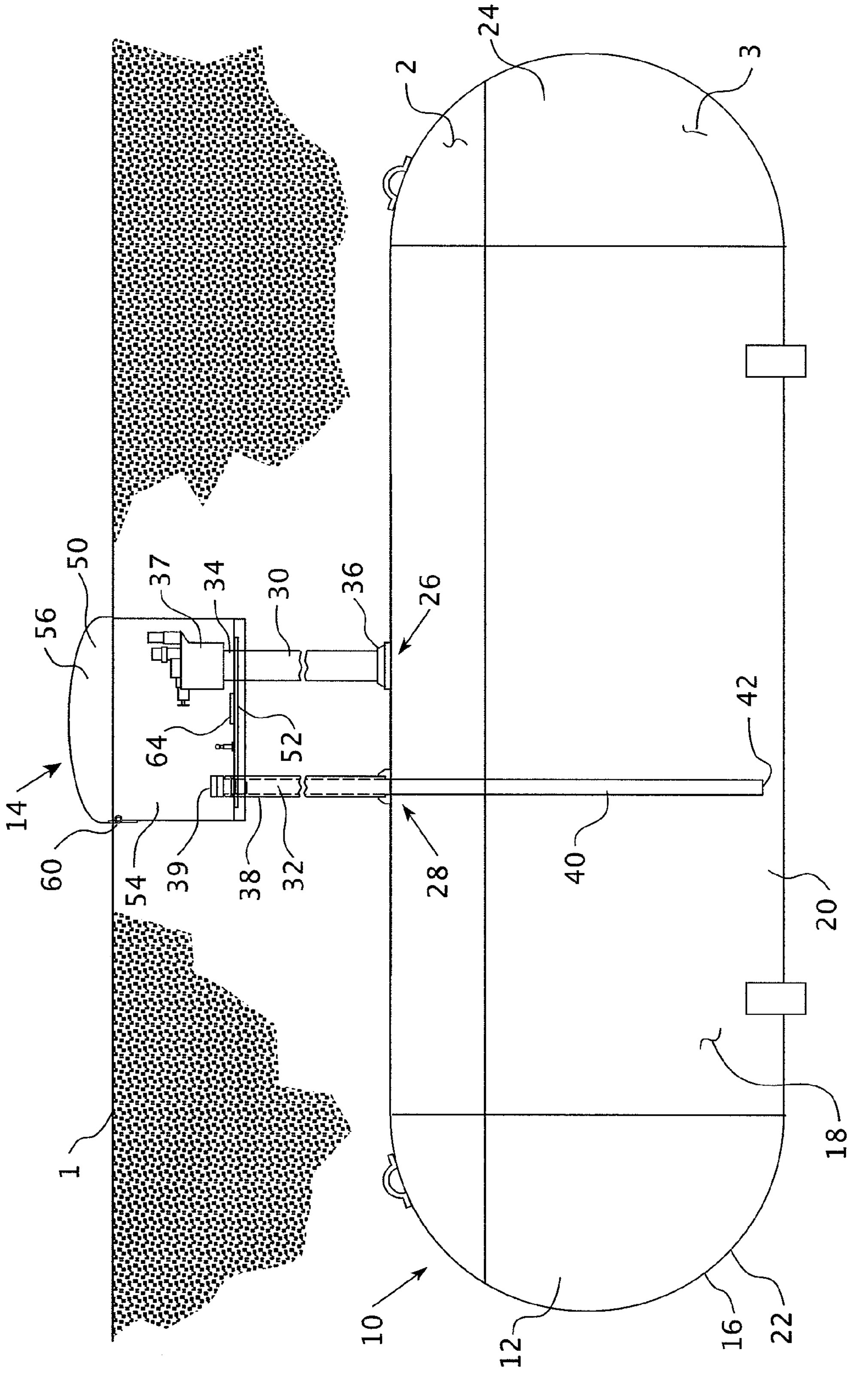
FIG. 1 is a cross-sectional side view of an underground tank.

As shown in FIG. 1, an underground tank 10 includes a vessel assembly 12 and an access assembly 14. The vessel assembly 12 includes a sidewall 16 defining an enclosed space 18. While the vessel assembly 12 may have any shape, the vessel assembly sidewall 16, preferably, includes an elongated cylindrical portion 20 and two hemispherical end portions 22, 24. The longitudinal axis of the vessel assembly 12 extends generally horizontally under a ground surface 1. The vessel assembly sidewall 16 has, preferably, only two openings; a fuel line opening 26 and a withdrawal line opening 28, both of which are disposed at the top of the cylindrical portion 20. The vessel assembly 12 is structured to contain a fuel, such as, but not limited to, propane. The fuel is typically transferred into the vessel assembly 12 as a liquid; however, once the fuel is disposed within the enclosed space 18 a portion of the liquid evaporates. Thus, there is a vapor space 2 and a liquid space 3 within the enclosed space 18.

The access assembly 14 includes a fuel line 30, a withdrawal line 32 and a dome assembly 50. The fuel line 30 has a first end 34 and a second end 36. The fuel line first end 34 is disposed adjacent to the ground surface 1. The fuel line second end 36 is sealingly coupled to the vessel assembly 12 at the fuel line opening 26 and the fuel line 30 is in fluid communication with the enclosed space 18. A control assembly 37 having couplings for use devices, valves, gauges, and other such devices or structures as is known in the art, is disposed at the fuel line first end 34. In this configuration, a gaseous fuel or a liquid fuel may be passed through the control assembly 37 and the fuel line 30 into the enclosed space 18. Further, because the liquid fuel will settle in the liquid space 3 and because the fuel line 30 does not extend into the vessel assembly 12, when the vessel assembly 12 is filled with a fuel, the fuel line 30 is in fluid communication with the vapor space 2. Thus, the fuel line 30 may be used to extract gaseous fuel, but not liquid fuel, from the vessel assembly 12.

The withdrawal line 32 has a first portion 38 and a second portion 40. The withdrawal line first portion 38 and the withdrawal line second portion 40 are in fluid communication with each other. The withdrawal line 32 extends through the withdrawal line opening 28. The withdrawal line first portion 38 is disposed outside of the vessel assembly sidewall 16 and extends, generally vertically, toward the ground surface 1. The withdrawal line first portion 38 has a first end 39 disposed adjacent to the ground surface 1. The withdrawal line first end 39 is sealed with a check lock valve 86, as set forth below. The withdrawal line second portion 40 is disposed within the vessel assembly enclosed space 18 and has a second end 42 that is disposed adjacent to the bottom of the enclosed space 18. Thus, when the vessel assembly 12 is filled with fuel, the withdrawal line second end 42 will be disposed adjacent to the bottom of the liquid portion. As set forth above, as liquid fuel evaporates, the vessel assembly 12 becomes pressurized. Thus, when the withdrawal line check lock valve 86 is opened, the vessel assembly 12 pressure forces liquid fuel to be expelled via the withdrawal line 32.

The dome assembly 50 is coupled to the fuel line 30 and the withdrawal line 32 at a point adjacent to, but below, the fuel line first end 34 and the withdrawal line first end 39. As such, the dome assembly 50 is spaced from the vessel assembly 12. Preferably, the dome assembly base plate 52 (described below) is spaced between about thirteen to fifteen inches from the vessel assembly 12 and, more preferably about fourteen inches from the vessel assembly 12. The fuel line 30 and the withdrawal line first portion 38 may be of any length and, as such, the vessel assembly 12 may be buried at any depth.

Figure 2:
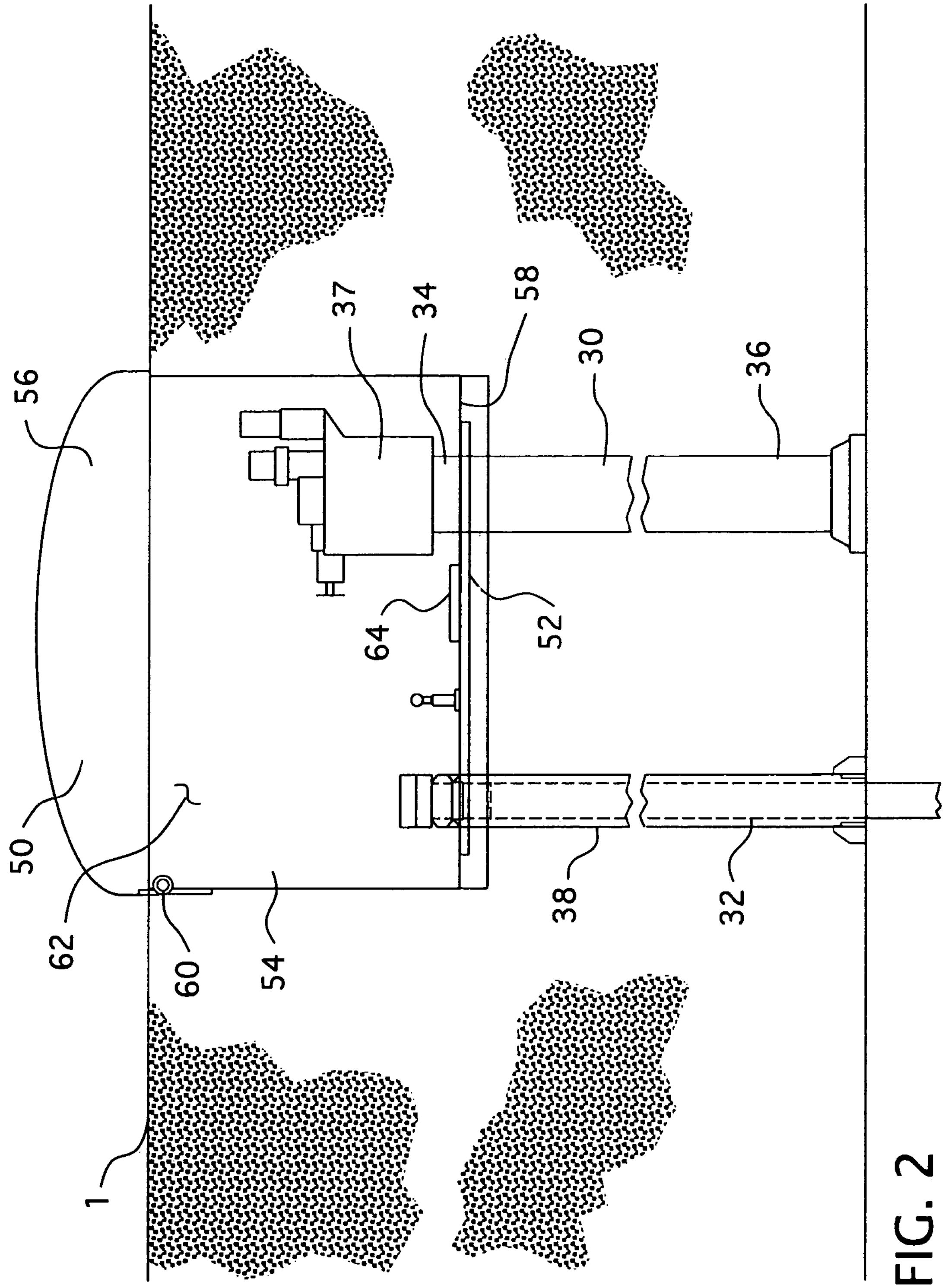
FIG. 2 is a detailed cross-sectional view of the access assembly.

As shown on FIG. 2, the dome assembly 50 includes a planar base plate 52, a collar 54 and a lid 56. In the preferred embodiment, the dome assembly 50 also includes a bottom member 58, as described below. The base plate 52 is fixedly attached to the fuel line 30 and the withdrawal line 32 at a point adjacent to, but below, the fuel line first end 34 and the withdrawal line first end 39. The collar 54 is, preferably, a generally cylindrical body. The collar 54 is coupled to the base plate 52. The lid 56 is removably coupled to the collar 54. Preferably, the lid 56 is coupled to the collar 54 by a hinge 60. In this configuration, the dome assembly 50 defines a dome enclosed space 62. Further, the control assembly 37 and the withdrawal line check lock valve 86 are disposed above the base plate 52 and within the dome enclosed space 62.

A data plate 64 for the vessel assembly 12 is fixedly attached to the base plate 52. As such, the requirement that the data plate 64 be fixed to the vessel assembly 12 is accomplished. The collar 54 has a length between about nine and eleven inches, and more preferably, about ten inches. With such a limited collar 54 length, the data plate 64, as well as other components disposed within the dome enclosed space 62 are easily accessible. Additionally, the diameter of the collar 54 is sized between about sixteen and nineteen inches and, more preferably, about eighteen inches, in order to provide easy access to the dome enclosed space 62.

Figure 3A:
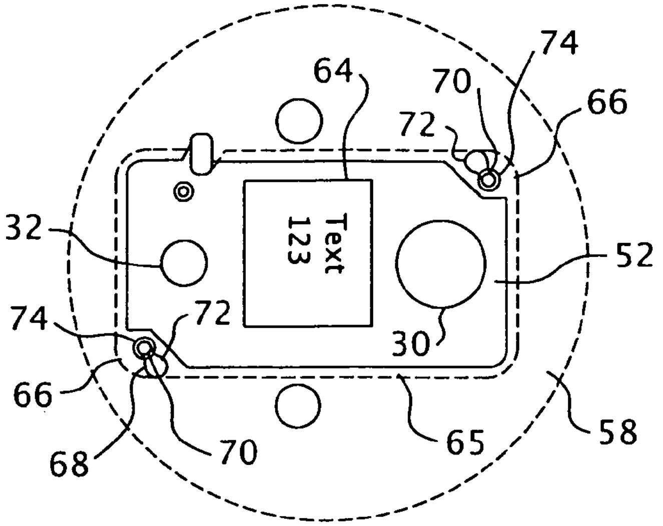
FIG. 3A is a top view of the dome assembly in the locked position.
Figure 3B:
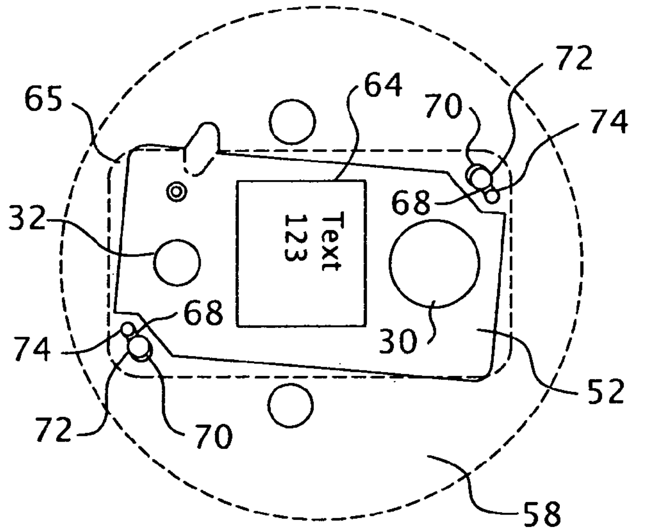
FIG. 3B is a top view of the dome assembly in an unlocked position.
Figure 3C:
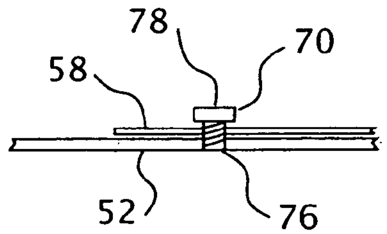
FIG. 3C is a detailed view of a locking key.

In a preferred embodiment, the dome assembly 50 is substantially removable. That is, as shown in FIGS. 3A-3C, in a preferred embodiment, the dome assembly 50 includes the bottom member 58 which is removably coupled to the base plate 52. The bottom member 58 is attached to the collar 54 and extends generally perpendicular to the collar 54. The bottom member 58 includes a central opening 65 having generally the same shape as the base plate 52 but sized slightly smaller than the base plate 52. The bottom member 58 also includes at least one, and preferably two, tab(s) 66 which, when the central opening 65 is placed over the base plate 52, extend a more substantial length over the base plate 52. The tabs 66 each have a key opening 68 which is an element of a dome assembly locking device 69. The other element of the dome assembly locking device 69 is at least one, and preferably two, key(s) 70 extending upwardly from the base plate 52. The key openings 68 are shaped with a wide portion 72 and a narrow portion 74 (FIGS. 3A and 3B). The keys 70 each have a stem 76 and a head 78 (FIG. 3C). Thus, as shown in FIG. 3B the bottom member 58 may be placed over the base plate 52, with the fuel line 30 and the withdrawal line 32 passing through the central opening 65 and the key heads 78 passing through the key opening wide portions 72, until the bottom member 58 engages the base plate 52 and the key stems 76 are disposed in the key openings 68. The bottom member 58 may then be rotated so that the key stem 76 is disposed in the key opening narrow portion 74. In this position, the bottom member 58 may not be lifted off the base plate 52. Additionally, the key stems 76 may be threaded so that the keys 70 may be tightened thereby locking the bottom member 58 to the base plate 52. It is further noted that the data plate 64 is visible though the central opening 65.

Figure 4:
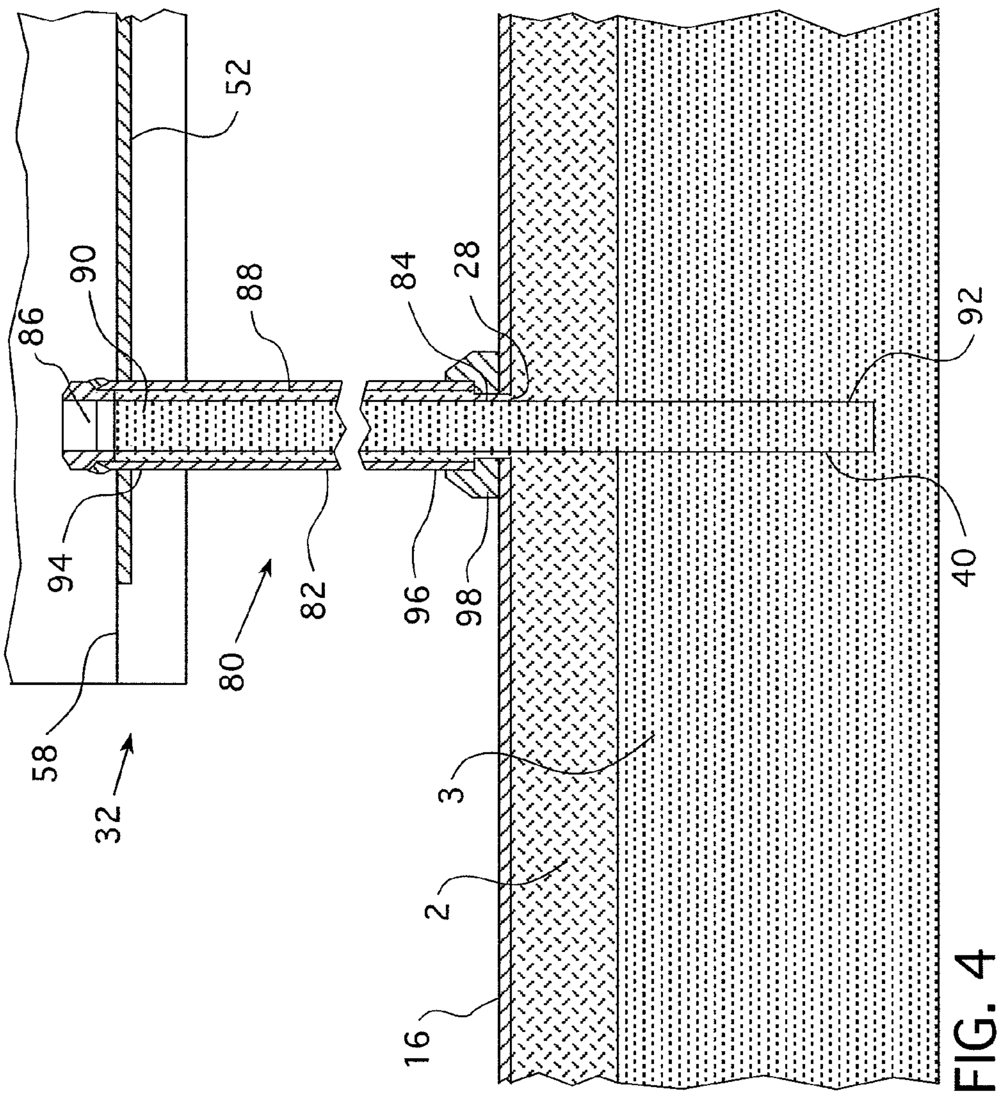
FIG. 4 is a detailed cross-sectional view of the withdrawal line.

Because the withdrawal line 32 of the present invention extends above the vessel assembly side wall 16, there is a possibility that the withdrawal line 32 could be exposed to unintended forces, e.g., shifting earth or a lateral force applied to the dome assembly 50. Such a force could rupture the withdrawal line first portion 38. As noted above, the liquid fuel within the vessel assembly 12 may be under pressure and be forced out of the vessel assembly 12 through the withdrawal line 32. To reduce or prevent the spillage of liquid fuel, the withdrawal line 32 includes a withdrawal line pressure release device 80 shown in FIG. 4. The withdrawal line pressure release device 80, preferably, includes an outer shell 82, an inner pipe 84, and a check lock valve 86 (shown schematically). A plenum 88 exists between the outer shell 82 and the inner pipe 84. The inner pipe 84 has a first, upper end 90 and a second, lower end 92. The inner pipe upper end 90 extends into the dome assembly enclosed space 62. The inner pipe 84 extends downwardly through the outer shell 82 and said withdrawal line opening 28 into said liquid space 3. The check lock valve 86 is removably disposed in the inner pipe upper end 90 and is structured to seal the inner pipe 84. The outer shell 82 has a first end 94 and a second end 96. The outer shell first end 94 is sealingly coupled to the inner pipe upper end 90. The outer shell second end 96 is sealingly coupled to the vessel assembly sidewall 16 about the withdrawal line opening 28. The outer shell second end 96 may include a flange 98 for additional support. The vessel assembly vapor space 2 is in fluid communication with the plenum 88. Thus, if the withdrawal line 32 is damaged to the point that the outer shell 82 is ruptured, the gaseous fuel within the vessel assembly 12 will pass through the plenum 88 and escape through the rupture in the outer shell 82. As the gaseous fuel escapes, the vessel assembly 12 is depressurized and liquid fuel will not be forced out of the withdrawal line 32.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An underground storage tank structured to be disposed below a ground surface, said underground storage tank comprising:

a vessel assembly having a sidewall defining an enclosed space;

an access assembly having a dome assembly, a fuel line, and a withdrawal line;

said fuel line having a first end and a second end, said fuel line first end being disposed adjacent to said ground surface and said fuel line second end being coupled to said vessel assembly, said fuel line being in fluid communication with said enclosed space;

said withdrawal line having a first portion and a second portion, said withdrawal line first portion and said withdrawal line second portion being in fluid communication with each other, said withdrawal line first portion being disposed outside of said vessel assembly sidewall and said withdrawal line second portion being disposed within said vessel assembly enclosed space;

said dome assembly coupled to said fuel line first end and said withdrawal line first portion, and spaced from said vessel assembly;

said dome assembly includes a generally planar base plate, a collar and a lid;

said base plate coupled to said fuel line and said withdrawal line;

said collar coupled to said base plate;

said lid pivotally coupled to said collar; and said base plate, said collar and said lid defining an enclosed dome space.

2. The underground storage tank of claim 1 wherein said collar has a length between about nine and eleven inches.

3. The underground storage tank of claim 1 wherein said collar has a length of about ten inches.

4. The underground storage tank of claim 3 wherein said dome assembly also includes a data plate, said data plate attached to said base plate.

5. The underground storage tank of claim 1 wherein said base plate is spaced between about thirteen to fifteen inches from said vessel assembly.

6. The underground storage tank of claim 5 wherein said base plate is spaced about fourteen inches from said vessel assembly.

7. The underground storage tank of claim 1 wherein said collar is removably coupled to said base plate.

8. The underground storage tank of claim 7 wherein said collar is rotatably coupled to said base plate.

9. The underground storage tank of claim 7 wherein:

said dome assembly also includes bottom member, said bottom member attached to said collar;

said base plate having at least two keys extending away from said vessel assembly; and said bottom member having two arced, keyed openings, each keyed opening is structured to align with one said key.

10. The underground storage tank of claim 1 wherein said withdrawal line includes a pressure release device structured to vent vapor from said vessel assembly.

11. The underground storage tank of claim 10 wherein said pressure release device is structured to operate when said withdrawal line is damaged.

12. The underground storage tank of claim 10 wherein:

said vessel assembly enclosed space includes an upper, vapor space and a lower, liquid space;

said vessel assembly sidewall having a withdrawal line opening;

said withdrawal line pressure release device includes a check lock valve, an outer shell, an inner pipe, and a plenum between said outer shell and said inner pipe;

said inner pipe having a first, upper end and a second, lower end, said upper end extending into said dome assembly, said inner pipe extending through said outer shell and said withdrawal line opening into said liquid space;

said check lock valve removably disposed in said inner pipe upper end and structured to seal said inner pipe; and said outer shell having first end and a second end, said outer shell first end sealingly coupled to said inner pipe upper end, said second end sealingly coupled to said vessel assembly sidewall about said withdrawal line opening, and wherein said vessel assembly vapor space is in fluid communication with said plenum.

13. The underground storage tank of claim 12 wherein:

said dome assembly includes a generally planar base plate, a collar and a lid;

said base plate coupled to said fuel line and said withdrawal line;

said collar coupled to said base plate;

said lid pivotally coupled to said collar; and said base plate, said collar and said lid defining an enclosed dome space.

14. The underground storage tank of claim 13 wherein said dome assembly also includes a data plate, said data plate attached to said base plate.

15. The underground storage tank of claim 13 wherein said base plate is spaced between about thirteen to fifteen inches from said vessel assembly.

16. The underground storage tank of claim 15 wherein said base plate is spaced about fourteen inches from said vessel assembly.

17. The underground storage tank of claim 13 wherein said collar is removably coupled to said base plate.

18. The underground storage tank of claim 17 wherein:

said dome assembly also includes bottom member, said bottom member attached to said collar;

said base plate having at least two keys extending away from said vessel assembly; and said bottom member having two arced, keyed openings, each keyed opening is structured to align with one said key.

19. An underground storage tank comprising:

a vessel assembly having a sidewall defining an enclosed space having an upper, vapor space and a lower, liquid space;

said vessel assembly sidewall having a withdrawal line opening;

an access assembly having a dome assembly, a fuel line, and a withdrawal line;

said fuel line having a first end and a second end, said fuel line first end being disposed adjacent to said ground surface and said fuel line second end being coupled to said vessel assembly, said fuel line being in fluid communication with said enclosed space;

said withdrawal line having a first portion and a second portion, said withdrawal line first portion and said withdrawal line second portion being in fluid communication with each other, said withdrawal line first portion being disposed outside of said vessel assembly sidewall and said withdrawal line second portion being disposed within said vessel assembly enclosed space;

said withdrawal line further including a check lock valve, an outer shell, an inner pipe, and a plenum between said outer shell and said inner pipe;

said inner pipe having a first, upper end and a second, lower end, said upper end extending into said dome assembly, said inner pipe extending through said outer shell and said withdrawal line opening into said liquid space;

said check lock valve removably disposed in said inner pipe upper end and structured to seal said inner pipe; and said outer shell having first end and a second end, said outer shell first end sealingly coupled to said inner pipe upper end, said second end sealingly coupled to said vessel assembly sidewall about said withdrawal line opening, and wherein said vessel assembly vapor space is in fluid communication with said plenum.

* * * * *